Nov. 16, 1965    H. E. ASMANN ETAL    3,218,552
SOLIDS DETERMINATOR FOR ESTABLISHING POUNDS OF SOLIDS IN FRUIT
Filed Feb. 25, 1963    5 Sheets-Sheet 1

INVENTORS
H. E. Asmann
Malcolm Paul Murray

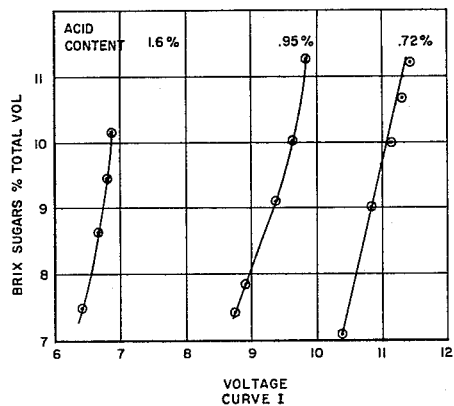
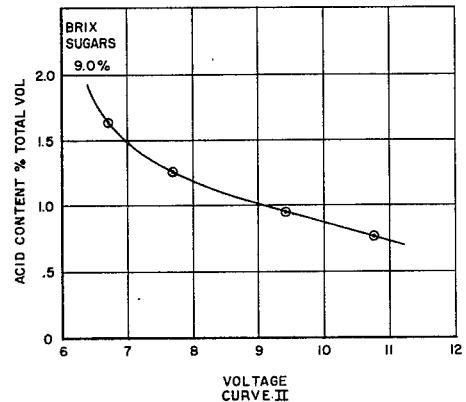
VOLTAGE VARIATIONS
-VS-
BRIX AND ACID CONTENT IN
JUICE SOLUTIONS
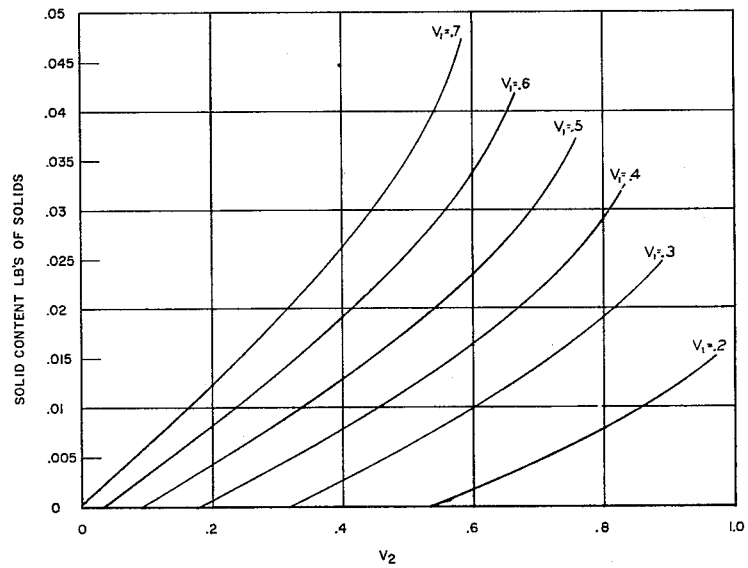
SOLID CONTENT
-VS-
METER 1 AND METER 2
VOLTAGES
CURVE III
FIG. 4

3,218,552
SOLIDS DETERMINATOR FOR ESTABLISHING
POUNDS OF SOLIDS IN FRUIT
Horst E. Asmann and Malcolm Paul Murray, Orlando,
Fla., assignors to Mechtron Corporation, Orlando, Fla.,
a corporation of Florida
Filed Feb. 25, 1963, Ser. No. 260,597
15 Claims. (Cl. 324—65)

This invention relates to a device for appraising citrus fruit by determining the pounds of solids present in selected samples of the fruit, and more particularly to a device designed for non-destructive testing and equipped with electrodes designed to pierce the fruit to selected depths in order that the quality of the fruit may be ascertained as a function of its electrical impedance.

In the multimillion dollar frozen citrus juice industry, a processor is concerned with the pounds of solids contained in a grove or other large quantity of fruit, rather than being concerned with physical appearance of the fruit as the principal criterion. "Pounds of solids" is a term of art relating to the quantity of sugars contained in a given amount of juice, which is a criterion of considerable concern to this industry. A solution of orange juice can be taken to be made up of sugars, acid, and a number of minor constituents. The sugars in the solution are of two general types, dextrose and fructose or levulose. In solution, these sugars experience a certain amount of disassociation but overall remain inert or non-reactive. Since the sugars do not contribute to the conductivity of the solution, their effect is to impede the flow of current, and this fact accordingly leads to the suggestion of a fixture having the capability of passing electrical current through fruit so that some factor associated with quality, ripeness or the like may be measured by electrical characteristics.

The Fairchild et al. Patent No. 2,063,840 and the Hilton Patent No. 2,582,629 represent electrical devices concerned with measuring the moisture in tobacco and meat, respectively, and the Moore Patent No. 1,987,244 is concerned with measuring the maturity of pears and the like. However, accurate measurement of quality of citrus fruit by prior art electrical means of this general type has not heretofore been possible.

In solution, the rather considerable percentage of acid present in citrus fruit may be expected to disassociate or break up into a combination of ionized particles and free electrons. The acid particles will be current carriers and constitute the majority of the "working portion" of the solution as a conductor. Therefore, an increase in the amount of acid in a given solution will be expected to result in an increase in current carriers and therefore a decrease in the resistivity of the solution, which of course requires less voltage for the maintenance of a given amount of current flow through the solution. Inasmuch as this decrease in resistivity causes a decrease in the amount of voltage necessary to cause a given amount of current to flow through the fruit, it is in most instances necessary to asscertain and/or apply a corrective factor to compensate for the acid level of a given orange, grapefruit or other such fruit before an impedance value truly indicative of the pounds of solids in the fruit can be established.

It may be stated that there are two unknowns to be determined from each piece of fruit tested. A first of these is the degrees of Brix, which is a term related to the measurement of the percent of solids in the juice. The other unknown, unless graded fruit is involved, is the weight of juice in each individual piece of fruit tested. In accordance with this invention, we have established that by taking two or so separate electrical measurements on each fruit sample being tested, these electrical measurements will enable the two unknowns to be established. The results obtained by taking a large number of sample readings have been set forth in the form of families of predetermined empirically obtained curves set forth herein and discussed at length.

It will be appreciated that by the use of our device, the degrees of Brix and volume of juice in a given piece of fruit can be ascertained, these making possible the establishment of the pounds of solids (actually the pounds of solids divided by one hundred), inasmuch as the degrees of Brix multiplied by the weight of juice results directly in pounds of solids.

It is therefore an object of this invention to provide a device which makes it possible to conduct a sufficient number of electrical tests as to enable pounds of solids to be immediately and easily obtained. A preferred version of such a device utilizes a plurality of probes disposed in substantially opposed relation and relatively movable so as to cause the tips of the probes to pierce for selected distances a fruit sample such as a whole orange, grapefruit or the like. Alternating current is then made to pass between opposed probe tips while certain electrical measurements sufficient for impedance to be calculated are conducted. By changing the spacing of the probes in a pre-established manner during the testing of a given fruit sample, separate tests can be conducted, directed to the establishment of the degrees of Brix in the fruit sample and the weight of juice in the sample, with such tests advantageously being performed without it being necessary to cut the piece of fruit as was required by previously known tests on citrus fruit. This is to say, not only does our device enable accurate and rapid tests to be conducted, but also our test results quite significantly are repeatable, thus enabling any possible arguments between buyer and seller of citrus fruit as to the excellence thereof to be easily settled in a minimum of time and with a minimum of testing.

As is therefore to be seen, we provide in accordance with this invention an instrument for determining electronically the pounds of solids in citrus fruit or the like, which instrument may utilize a plurality of relatively movable probes disposed in substantially opposed relation and adapted to be selectively moved in the distance decreasing direction for an extent sufficient for the probe tips to penetrate for pre-established distances, the fruit sample placed therebetween. The arrangement, as previously mentioned, is such that the charactresitic impedance of the fruit can be ascertained by establishing a flow of alternating current between the tip portions of the substantially oppositely disposed probes, thereby causing the current to pass through a portion of the interior of the fruit sample being tested. Preferably, a set of probes is employed to penetrate from each side of the fruit sample, each set of probes being disposed in a circular array about a metal mounting means. The plurality of substantially aligned opposed pairs of probes is preferred so that as many opposed pairs of probes as possible will each be disposed in a common section or segment of the orange. This is because the current necessary to pass through the membranes defining the eleven or so sections of an orange is of a different value than the current necessary to go from one end to the other of a given section. Accordingly, by using a plurality of pairs of substantially aligned opposed probes and a preestablished current flow, we can obtain with a high degree of accuracy the voltage drop across the orange and hence obtain information relating to the impedance value of the fruit sample.

If the fruit is of a known acidity value, the impedance value can be directly related to the pounds of solids. In most instances, however, it may be desirable to normalize the effect of the acid of the fruit, or in other words, cancel out the effect the variation of acidity of the fruit has upon the passage of current therethrough. This is accomplished in accordance with this invention by the use of a pair of so called minor probes, disposed on opposite sides of the device so as to penetrate through the skin of the fruit at such times as the principal probes are inserted. These minor probes of dissimilar metals are not connected to the common mounting means of the major probes, but are independently arranged so as to cause the creation of a minor flow of current through the probes by galvanic action. The voltage developed by the minor probes is directly relatable to the acid content of the fruit, and is used in correcting the output of the major probes as will hereinafter be discussed.

Although our device does not require the use of a variable distance major probe arrangement if graded fruit is to be tested, a preferred embodiment of our device comprehends the use of major probes movable for selected distances into the fruit being tested, so that the size of the fruit can be taken into consideration when conducting one of the electrical measurements. For example, a fixture constructed in accordance with this invention may utilize a form of spacer arrangement so that a first electrical test can be conducted on each orange or other such fruit being tested, with the tips of the probes extending for a constant penetration distance into each piece of fruit tested. Subsequent to each such test another electrical test is contemporaneously conducted without the use of the spacer arrangement with the probe tips being caused to approach each other more closely so as to enable the impedance of a known size central section of the fruit to be tested.

Preferably we ascertain impedance by the use of a constant current of say 25 microamperes flowing between opposite sets of major probes through the fruit, and ascertain the voltage drop across the orange. This voltage reading may be obtained at the wide or constant penetration probe spacing on a first voltmeter after the electronic circuitry associated with our invention has made any necessary correction based upon the voltage developed by the minor probes. This reading is a function of the amount of juice in the fruit sample, and the degrees of Brix. Then, upon the probes being moved to the close distance, a reading predominately related to Brix is obtained on a second voltmeter. By reading the certain scale of the second voltmeter which was indicated by the value of the first voltmeter reading, we are able to directly obtain from the second voltmeter the pounds of fruit reading of the orange.

Other objects, features and advantages of this invention will be more apparent from an inspection of the enclosed drawings in which:

FIGURE 4 is a sheet of exemplary curves showing some of the factors upon which this invention is based; and, FIGURE 5 is a block diagram of an alternate version of the electrical circuitry of this invention, designed for use when simplified operation is required.

Figure 1:
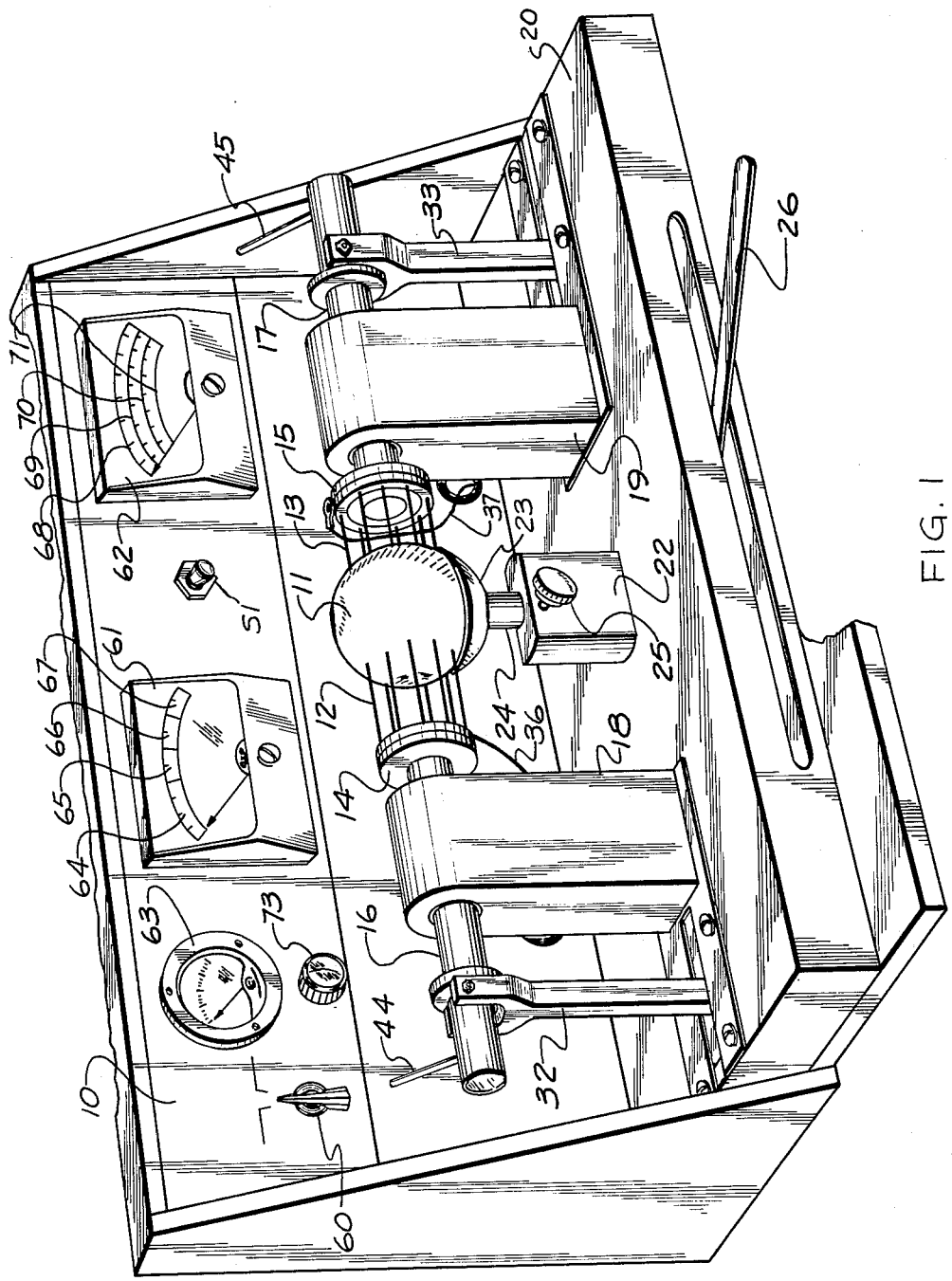
FIGURE 1 is a perspective showing of a preferred device in accordance with this invention, in which an orange is shown impaled by the sets of probes.

Turning to the figures of the drawing, in FIGURE 1 an arrangement is revealed for conducting electrical measurements upon citrus fruit or the like. Cabinet 10 is arranged to receive in a portion thereof an orange 11 or the like, which is disposed so as to be impaled by probes 12 and 13. These probes preferably are relatively movable toward and away from the orange so that the depth of penetration of the orange by the sets of probes may be easily controlled. The probes are of conductive material and each set mounted upon a common metallic ring, but preferably are coated so that only the tips of the probes are conductive.

The metal rings upon which the sets of probes are mounted are secured upon left mounting member 14 and right mounting member 15, each member preferably being of plastic. The probes for example may be in the general nature of hypodermic needles whose holes have been plugged, and whose exteriors have been coated with Hysol or other such plastic coating or the like to make the external surfaces of the needles non-conductive except for the tip portions. Were it not for the fact that only a fixed length of tip portion, such as ½″, is exposed to the inner portion of the fruit that has been impaled, every time the depth of penetration of the probes was changed, this would tend to affect the voltage reading.

Although only a single probe disposed on each of the mounting members would be sufficient for some utilizations, we prefer to use a plurality of probes disposed in a substantially circular array on each mounting member, with the probes of one member being in substantial alignment with the probes of the opposed mounting member. This construction is preferred because we have found that more satisfactory results ensue if at least one opposed pair of probes are disposed in the same segment of the orange, or other such fruit. This is to say, it is desirable that a probe of the left mounting member be disposed in one end of one orange section, and one probe of the right mounting member disposed in the other end of the same section. Since the probes when extending into the fruit in effect form a number of parallel circuits, it is not important that a large number of opposed pairs be disposed in their own respective segments of the fruit. However, these considerations do dictate the placement of the orange so that the stem or bloom end is facing the center of one probe array, thus assuring that the segments will extend generally horizontally in the device as shown in FIGURE 1.

The left mounting member 14 is supported upon the inner end of rod 16 that is slidably mounted in left support member 18, whereas right mounting member 15 is supported upon the inner end of rod 17 that is slidably mounted in right support member 19. Both the left support member 18 and the right support member 19 are mounted upon a mounting base 20 that is located in a forward portion of the cabinet and disposed in a generally horizontal position. Also mounted upon base 20 is the fruit supporting member 22 that is disposed approximately midway between the members 18 and 19. The fruit to be tested is received in a cup-like device 23 that is mounted at the upper end of a vertically slidable member 24 whose length is sufficient that the height of the cup 23 above the base member 20 may be adjusted so that the tips of the sets of probes 12 and 13 will intercept the orange at the desired location. Tightening the screw 25 enables the height of the cup to be firmly established.

The rods 16 and 17 are movable axially toward and away from each other by means of the manipulations of handle 26 that may be disposed in the forwardmost portion of the housing and movable in a generally horizontal plane. As shown perhaps best in FIGURE 2, this handle is rotatable about a vertically disposed handle mounting member 27 whose upper end is secured to a rotatable member 28. Pinned to opposite sides of 28 are linkage rods 30 and 31, in the remote ends of which are secured to vertical members 32 and 33, disposed in appropriate slots as shown. The upper ends of members 32 and 33 are preferably bifurcated and respectively secured to left and right axially slidable rods 16 and 17, previously mentioned, so that the movement of these rods toward and away from the orange may be brought about by the aforementioned manipulations of the handle 26. The occasion for the selectivity of these movements will be discussed more fully hereinafter.

Figure 2:
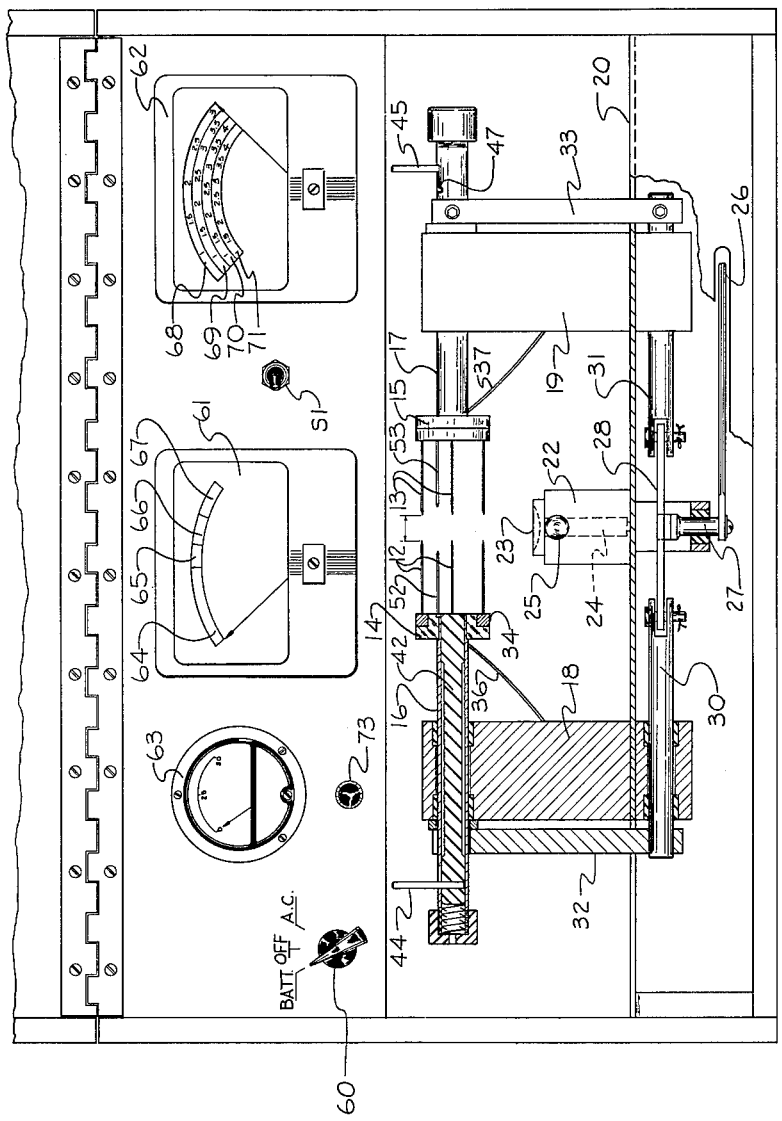
FIGURE 2 is a front elevational view of the device of FIGURE 1, but showing certain details of the mechanism.

In accordance with this invention, an alternating current potential difference is impressed between the tips of the left probes 12 and the tips of the right probes 13, and in order that this may be done, the probes 12 may for example be secured at spaced locations about metallic ring 34 shown in cross section in FIGURE 2. To this ring a conductor 36 is connected so that the probes 12 can be brought to a desired potential. Similarly, conductor 37 is provided for impressing an A.C. potential upon probes 13 that is at all times opposite to that of probes 12.

It is usually desired to conduct two or more different electrical tests upon each orange or the like that has been impaled by the probes, inasmuch as the sugar and the juice content necessary for determining the pounds of solids in the orange must each be ascertained. Therefore it is desirable to obtain an electrical reading with the tips of probes 12 and 13 disposed at two depths, one of these being a constant penetration into the sides of the given orange. Then a separate electrical test is conducted with the probe tips disposed closer together in what is hereinafter referred to as the constant distance test.

In order that consistency may be obtained in these tests, the rods 16 and 17 that are designed to be substantially hollow and equipped with slidable inner members, such as member 42 shown in cross section in FIGURE 2. These slidable members in rods 16 and 17 may be moved relative to rods 16 and 17 by members 44 and 45, respectively, to positions in which they protrude beyond the probe mountings and actually extend between the probes for some distance. Inasmuch as these inner members are of substantial cross section, they will come in contact with the outer skin of the piece of fruit after the handle 26 has been moved to cause the probes to penetrate for a certain distance into the fruit, and prevent the probe tips from extending therein for more than that certain desired distance. The members 44 and 45 may be received in notches such as 47 in FIGURE 2 so as to prevent these inner members from telescoping into their respective rods when the fruit is contacted.

Figure 3:
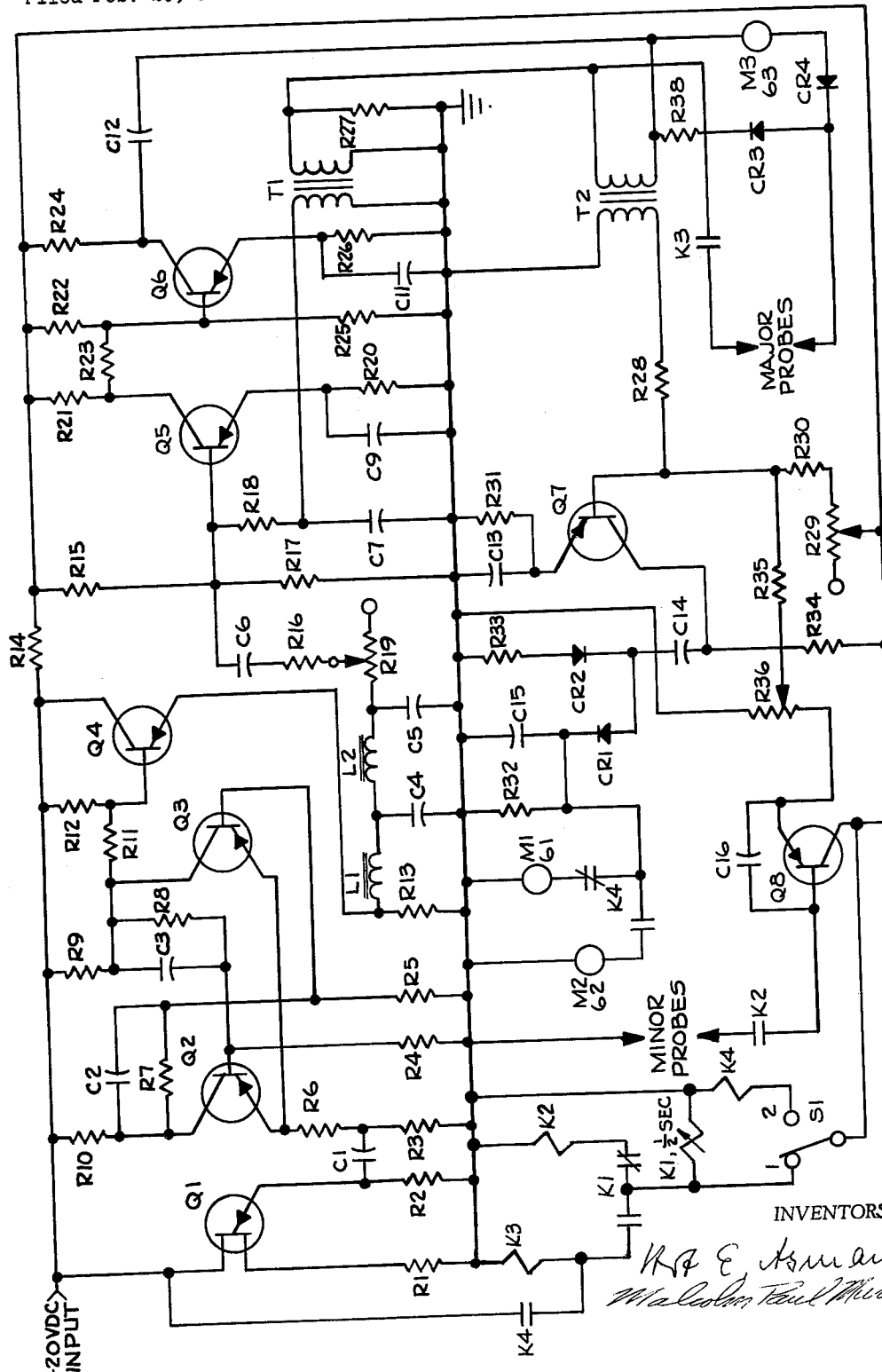
FIGURE 3 is a preferred circuit diagram for carrying out the electrical tests described herein.

An additional electrical test involves the use of so called minor probes of dissimilar metal, such as probe 52 which may be of zinc and probe 53 which may be of copper. The minor probes are mounted in insulated relationship in plastic members 14 and 15 respectively, and have individual electrical connections. These probes are just slightly shorter than the major probes, as revealed in FIGURE 2. When the minor probes, along with the major probes, have been caused to penetrate the skin of the fruit, a small voltage is created by galvanic action which, as hereinafter will be explained in detail, enables the acidity of an orange or any other such citrus fruit to be ascertained, and this acidity value taken into consideration in arriving at the output values indicative of the pounds of solids in a given orange. These probes are connected to the circuitry as shown in FIGURE 3.

Before proceeding further with the description of the present device, perhaps a brief reference should be made to FIGURE 4, wherein Curve I reveals that the voltage developed across oranges of different acidity is in each instance directly proportional to the Brix content of the oranges. Curve II on the other hand reveals that the voltage developed across an orange through which constant current is flowing is inversely proportional to the acid content. Curve III is in reality a family of empirically obtained curves enabling the voltage reading V1 made during the constant penetration test, and voltage V2 made during the constant depth test to be employed for obtaining a direct indication of pounds of solids.

During the practice of this invention, voltmeters may be employed, whose output readings may be directly applied to the appropriate curves of Curve III to obtain pounds of solids readings. However, it is preferred to calibrate the faces of the voltmeters so that the graphical relation of pounds of solids for given V1 and V2 voltage readings may be obtained without the intermediate step of resorting to the curves.

To that end we provide voltmeters 61 and 62, which along with meter 63 may be disposed on the vertical section of the cabinet and designed to furnish electrical readings that enable the pounds of solids in a piece of fruit to be established. The meter 61 may for example have a face that is calibrated into sections, such as for example into groupings of four different colors. These may be the colors green, white, red and blue shown at 64, 65, 66 and 67 on the dial of meter 61. On voltmeter 62, four separate colored bands extend from left to right across the dial at different radii, each band being calibrated from 0 to approximately 4.5, with such numbers indicating pounds of solids in one orange multiplied by 100. The outer band 68 is of green, the next inner band 69 is of white, the third band 70 is red, and the innermost band 71 is blue, thus corresponding to the colors shown on meter 61. As may be obvious, a first electrical reading is thus obtained on meter 61, indicative of the voltage developed across the piece of fruit when the probes are disposed in their wide separated positions. The color indicated by the needle of meter 61 determines the band to be read on meter 62, latter reading representing the potential difference between the probes disposed at their close probe distance. The rationale of this arrangement of course is based upon one reading giving Brix and the other Brix plus volume.

The meter 63 is an micro-ammeter that is arranged to read from 0 to 50 microamperes. Knob 73 located below meter 63 enables a potentiometer R19 shown in FIGURE 3 to be set as to bring about a current of 25 microamperes, for example, flowing between the tips of probes 12 and 13 through the fruit when conducting various phases of electrical measurements upon a piece of fruit impaled by the probes, as will be discussed in greater detail hereinafter. Typically, once a setting of this potentiometer is made by the use of the current calibration meter 63, this setting need not be changed except for recalibration purposes, for the regulator section of this device maintains the current between oppositely disposed probe tips constant for variable spacing of the probes as well as for different oranges used.

Turning to the circuitry of an exemplary battery powered version of this device set forth in detail in FIGURE 3, transistors Q1, Q2 and Q3 are associated with the circuit that performs the function of furnishing the alternating current signal that is caused to flow through the fruit to be tested in accordance with this invention. The output of this portion of the device is quite stable, and preferably is a 60 cycle square wave.

Unijunction transistor Q1 serves as a triggering source for the Eccles-Jordan multivibrator constituted by transistors Q2 and Q3, there three transistors and related components thus amounting to a so called hybrid timing circuit of the type set forth in the General Electric Transistor Manual (fourth edition 1959), wherein on pages 145 and 146 it is described how a square wave of perfect symmetry can thus be generated. The R-C network constituted by R2 and C1 sets the frequency of the blocking oscillator constituted by transistor Q1. Latter transistor may be of type 2N491, whereas transistors Q2 and Q3 may be PNP transistors of type 2N1499A, and the power to the circuit may be supplied as shown from a −20 volt D.C. source.

As a result of this construction, a square wave is delivered to the base of transistor Q4 at a 16⅔ millisecond repetition rate, which of course corresponds to 60 pulses per second. Transistor Q4, which also may be of type 2N1499A, is disposed in an emitter follower configuration in which it serves as an impedance transformer, thus preventing the undue loading of the multivibrator. The square wave emanating from the emitter follower is sent through a low pass filter constituted by chokes L1 and L2 and capacitors C4 and C5, which filter is designed to attenuate any harmonics of the 60 cycle fundamental by having a cutoff at 100 cycles per second. The choke may have a value of 1.75H, whereas C4 and C5 may have values of 3 mf. and 20 mf., respectively.

The output from the filter section is a 60 cycle sine wave delivered to potentiometer R19. This potentiometer enables the magnitude of the 60 cps. signal to the major probes to be varied, thus providing, as previously mentioned, an adjustment for setting the current into the major probes to be 25 microamperes.

The regulator section, comprising the chokes and transistor Q5, is responsible for maintaining a constant current through the major probes 11 and 12 under conditions of varying impedance, such as for different probes settings and for various fruit samples.

The transistors Q5 and Q6 form in effect a two stage amplifier designed to provide a high gain amplification of the input from potentiometer R19, the setting of which potentiometer is of course brought about by the setting of knob 73 appearing in FIGURE 2. The two transistors Q5 and Q6 may be of type 1N1499A and connected in a common emitter configuration and are arranged to function with negative feedback, for reasons set forth hereinafter. The output from transistor Q5 is to the base of transistor Q6, with the output from the collector of Q6 going through capacitor C12, current calibration meter 63, diode CR4, the major probes (and fruit of course), relay contacts K3, and returning through sensing resistor R27 to ground. Diode CR4 is provided to allow only ½ cycle of the A.C. wave to pass through the meter 63, which is a D.C. meter. Diode CR3 provides a path for the opposite half cycle of the A.C. wave to bypass the meter circuit. In this manner these two diodes allow only the positive half cycles to be sensed by the meter.

The primary winding of transformer T1 is in parallel relation with resistor R27 so as to sense the voltage developed across resistor R27. This voltage is in direct proportion to the current through this resistor, and therefore proportional to the current through the major probes and the fruit. Resistor R27 may have a resistance of .470 megohms, which is approximately the maximum possible value in order to aid current regulation through an orange, which may have an impedance of 5,000 ohms.

The secondary of transformer T1 is wired in such a manner that an increase in voltage across the primary causes the voltage induced in the secondary to increase and be fed back in a reverse direction through R18 to the base of transistor Q5, to decrease the resultant input to this transistor. In this manner, the negative feedback from transformer T1 provides alteration of the input signal and therefore the current through the probes and fruit in the following fashion: If the current through the fruit (and R27) tries to increase, the feedback of opposite sign to the input to transistor Q5 thereby decreases the signal and current. If the current through R27 tries to decrease, the feedback will aid the signal into Q5 and therefore increase the signal to the major probes and increase the current. In this manner the achieving of constant current flow through the major probes is simplified.

Transformer T1 may be of type SSO-8 manufactured by United Transformer Company of Chicago, Illinois and have a primary impedance of 10,000 ohms and a secondary of 2,000 ohms. A sizable current through the primary is not required to provide output voltage from the secondary. As mentioned hereinbefore, the larger the impedance due to solids contained in the fruit the more voltage will need be developed across the fruit in order for constant current to flow.

Transformer T-2, which may be of type O-6 made by United Transformer Company, serves as an isolation transformer and has a primary impedance of 15,000 ohms and a secondary impedance of 95,000 ohms. The primary winding of this transformer is arranged to sense the voltage developed across the major probes, and to apply this voltage through its secondary and potentiometer R28 to the base of summing amplifier Q7. Latter transistor, which may be of type 1N1499A has an output which is fed through C14, diode CR1, and normally closed relay contacts K4 to meter 61, which is designed to provide a representation of the voltage developed across the major probes at the wide spacing and thus provide one aspect of the output reading of the device. Meter 62 is preferably employed for providing a voltage reading at the narrow probe spacing. Both meters 61 and 62 may be direct current meters inasmuch as diodes CR1 and CR2 are provided to convert the A.C. output of Q7 to D.C. in the same general manner described for meter M3. Capacitor C15 is a smoothing capacitor to remove pulsations in the D.C., whereas R32 serves as a shunt to place the D.C. in the desired range.

It is desired to provide in accordance with this invention a correction for the acidity of the fruit, thus to prevent a false indication of the amount of solids in the fruit. To that end an arrangement is provided for measuring the potential developed across the minor probes 52 and 53 of dissimilar metal when they are inserted in a piece of fruit. This potential is delivered to the base of transistor Q8, which functions as an emitter follower, and may be of type 1N1499A. Its output is delivered to the base of transistor Q7 to effect a corrective change in the output of the transistor.

The larger the voltage that is developed across the minor probes, the larger the voltage output of transistor Q8. This voltage is applied to the base of transistor Q7 as a bias, which is arranged to be in such a direction that an increase in this voltage in effect causes a decrease in the output of transistor Q7, the meter amplifier transistor. This is to say, an orange with a high degree of acid causes a comparatively large amount of galvanic action to take place, which ultimately results in the effective gain of transistor Q7 being decreased and thus causing the output meters 61 and 62 to have outputs that are decreased proportionately. It may be noted that the output of transistor Q8 is modified by potentiometer R36 in order to effect a corrective change in transistor output, this potentiometer being factory set to compensate for component tolerances. Potentiometer R29 is provided to initially calibrate the meter 61 and 62 readings at the factory.

A relay system is provided in accordance with this invention to enable an operator of the device to selectively obtain readings upon meters 61 and 62. In a preferred arrangement, the meter 61 may furnish an output voltage that represents a reading that has been corrected for acidity. Referring to FIGURE 3, when switch S1 has been placed in position 1, as shown, this causes the supply voltage to be placed across the coil of relay K2, causing this relay to be energized. This in turn causes the normally open contacts of relay K2, which are disposed in the circuit of the minor probes, to close and thus allow the voltage generated by galvanic action of the dissimilar metal probes to be applied to transistor Q8 to affect the output of transistor Q7. Not only is the minor probe voltage delivered to the base of transistor Q8, but also it is used to charge capacitor C16 as well.

The supply voltage is also placed across the coil of relay K1 when the switch S1 is in position 1. However, instead of the contacts of latter relay becoming energized immediately, as a result of a time lag characteristic of this relay, approximately one-half second elapses before its contacts are operated. After this time lapse, the relay is energized, and its normally closed contacts open, de-energizing relay K2 and causing the normally open contacts in the circuit of the minor probes to open, thus disconnecting the minor probes from transistor Q8. Relay K1, which may be of type P26A1F6A made by Filtors, Inc., of New York, also operates at the same time to close its normally open contacts in the circuit of the coil of relay K3. Upon relay K3 becoming energized, its normally open contacts in the circuit of the major probes close to allow constant current to be caused to flow through the major probes and through the fruit placed thereon. Meter 61 now indicates, by virtue of the operation of the previously explained circuitry, the amount of voltage developed across the major probes, with the output thereof being modified by the charge on capacitor 16 resulting from the output of the minor probes. In other words, the position of the needle of meter 61 is determined by the voltage measured across the major probes, as modified by the voltage developed across the minor probes due to the acidity of the fruit.

As previously mentioned, the face of meter 61 is preferably calibrated into sections 64 through 67. Therefore, after the color of the section of the dial indicated by needle has been noted, switch S1 is moved to position 2, which causes relay K4 to be energized. Its normally closed contacts then open, removing meter 61 from the circuit, and its normally open contacts close to cause meter 62 to read the voltage developed across the major probes, such as when they have been moved to the closely spaced position. Upon a test now being conducted, the needle of meter 62 indicates, upon the scale of the meter corresponding to the section of the dial indicated on the first meter, a direct indication of pounds of solids. The closing of normally open contacts K4 disposed at the left side of FIGURE 3 enables relay K3 to remain energized during the second test and therefore enable the major probes to remain connected in the circuit.

As will be apparent to those skilled in the art, we may wire our device so as to be usable on house current as well as on batteries, the determination as to type of use being made on the front of the device by manipulation of power switch 60. In order that 60 cycle 110 volt house current may be used, it is only necessary that a power supply be employed to convert the 110 volts A.C. to 20 volts D.C., for application to the left hand side of the circuitry as shown in FIGURE 3.

To afford a fuller understanding of this invention, reference is made to FIGURE 4 wherein Curve I represents the variation in voltage drop for a constant current through a quantity of orange juice as the Brix sugars vary and all other constituents remain invariable. As revealed by the plotted test data, the relation between Brix sugars and voltage drop is very nearly a direct proportion, thus giving rise to one of the basic premises of this invention.

This relationship is maintained over a range of acid variations with the percentage of acid present causing a distinct effect on the relative placement of each curve. The illustrated curves reveal that as the Brix in the juice increases and therefore the solids content of a given size of orange increases, that the voltage drop will increase and therefore indicate that the excellence of an orange can be determined by this invention. This is another way of saying that there exists almost a straight line relationship between voltage drop across a given size orange, and the excellence of the fruit from the standpoint of pounds of solids if of course the effect of the acid has been eliminated from the samples tested. Stated by formula, the relation is $$V = f\left(\frac{KB}{A}\right)$$

where V is voltage, B is Brix, A is acid, and K is a constant.

Some authentication for this approach is based upon the fact that each curve for a different acid content maintains a characteristic shape; note that the curve on the left represents an orange having an acid content of 1.6%, the middle curve an acid content of .95%, and the third curve an acidity of .72%. As will be noted, the curves are of similar configuration, with of course an increased voltage being developed as acidity declines.

Curve II amounts to a somewhat different presentation, and in this curve Brix sugars are maintained constant at a realistic 9%, and the voltage developed is recorder for samples of oranges having different acidity. As will be noted from the curve drawn between the several test points, the relation between voltage developed and the acid content is an inverse proportion. This curve therefore dictates the use of the minor probes in accordance with this invention, for as will be appreciated by those skilled in this art, the varying acidity of different oranges should be prevented from causing a displacement of the Brix vs. voltage curve. Otherwise inaccuracies will be introduced by the acidity factor, unless of course it can be ascertained that all of the oranges to be tested for Brix sugars have the same acid content, which is usually not the case. Therefore, the usual operation of our invention involves the use of the so-called minor probes which, as previously mentioned, derive a voltage in accordance with acidity of an orange. This voltage is responsible for correcting the voltage reading that would otherwise be obtained across the major probes. In this manner, we obtain an indication on an orange-by-orange basis of the acidity of the fruit, and make appropriate correction therefor. This is to say, the voltage derived by the use of the minor probes is employed, as previously mentioned, to weigh the major probe readings in accordance with the acid curve.

Curve III shows for the solids determinator as heretofore described that the relationship between the voltage measurements of the major probes and the pounds of solids in a given orange may be found to exist on one curve of a family of curves here shown. The empirical data represented by these curves may be employed as follows:

The voltage measurement given by meter M1 (61) when the probes are in the constant penetration position directs the user to a given curve of the group of curves $V_1 = .2$ through $V_1 = .7$, where an increasing voltage $V_1$ is indicative of an increasing size orange and therefore defines a curve which is displaced to a higher position relative to the pounds of solids axis. It should also be noted, however, that each curve is related both to the size of the orange as well as Brix.

The second test is made with the major probes disposed in a different position than for the first test, the position for the second test usually being the close position in which no spacer is used and the probe tips are for example ½ inch apart. The reading of meter M2 (62), which may be regarded as voltage $V_2$, directs the user to a point on the abscissa, which he transfers to a given $V_1$ curve as previously indicated by the first test. The intersection of the $V_2$ reading with the selected curve enables a horizontal projection be made over to the ordinate of this graph, which is the solids content axis. The result is a direct reading of pounds of solids, which, as shown by this graph, is usually a few hundredths of a pound per orange.

The sequence of operation of our device is as follows:
(1) Move the power switch to the "Battery" position or "Line" position as use of device may dictate.
(2) Position the fruit sample on cup 23 with bloomstem axis parallel to the probes, and adjust height of cup until fruit is centered with respect to probe arrays. Lock the screw 25.
(3) Release levers 44 and 45 so that suitable members in rods 16 and 17 will extend to provide spacing for the constant penetration test.
(4) Move lever 26 to cause the probes to pierce fruit until such time as spacer members contact fruit.
(5) Move the Test Switch S1 to the Test 1 position, thus causing relay K2, then relay K1, then relay K3 to be energized.
(6) Turn current adjustment control knob 73 until meter 63 reads desired current, such as 25 microamperes.
(7) Read meter 61, noting color of section of dial indicated by needle position. This meter reading of course represents the major probe voltage reading after compensated for by acid content of fruit.
(8) Withdraw spacer members, and move lever 26 to cause the probes to enter to deepest penetration of fruit.

(9) Move Test switch S1 to the Test 2 position, thus to cause relay K4 to be energized to bring about activation of meter 62.

(10) Read scale of meter 62 whose color corresponds to color of section of meter 61 indicated by needle position during first test. The meter reading is in 1/100 pounds of solids.

If desired, the meters may be calibrated in volts, and the readings obtained therefrom applied to Curve III in order to obtain pounds of solids.

As an alternative of construction when graded fruit is being tested, the probes may be employed without use of spacer means, and the probes extended only to the closely spaced position for all tests. In this instance, meter 61 is connected to the minor probes and meter 62 to the major probes. The color of the section indicated by the needle of meter 61 represents the acid correction, and this information is used to indicate the dial of meter 62 to be read. This embodiment of course enables the amplifier gain changing arrangement to be eliminated.

Figure 5:
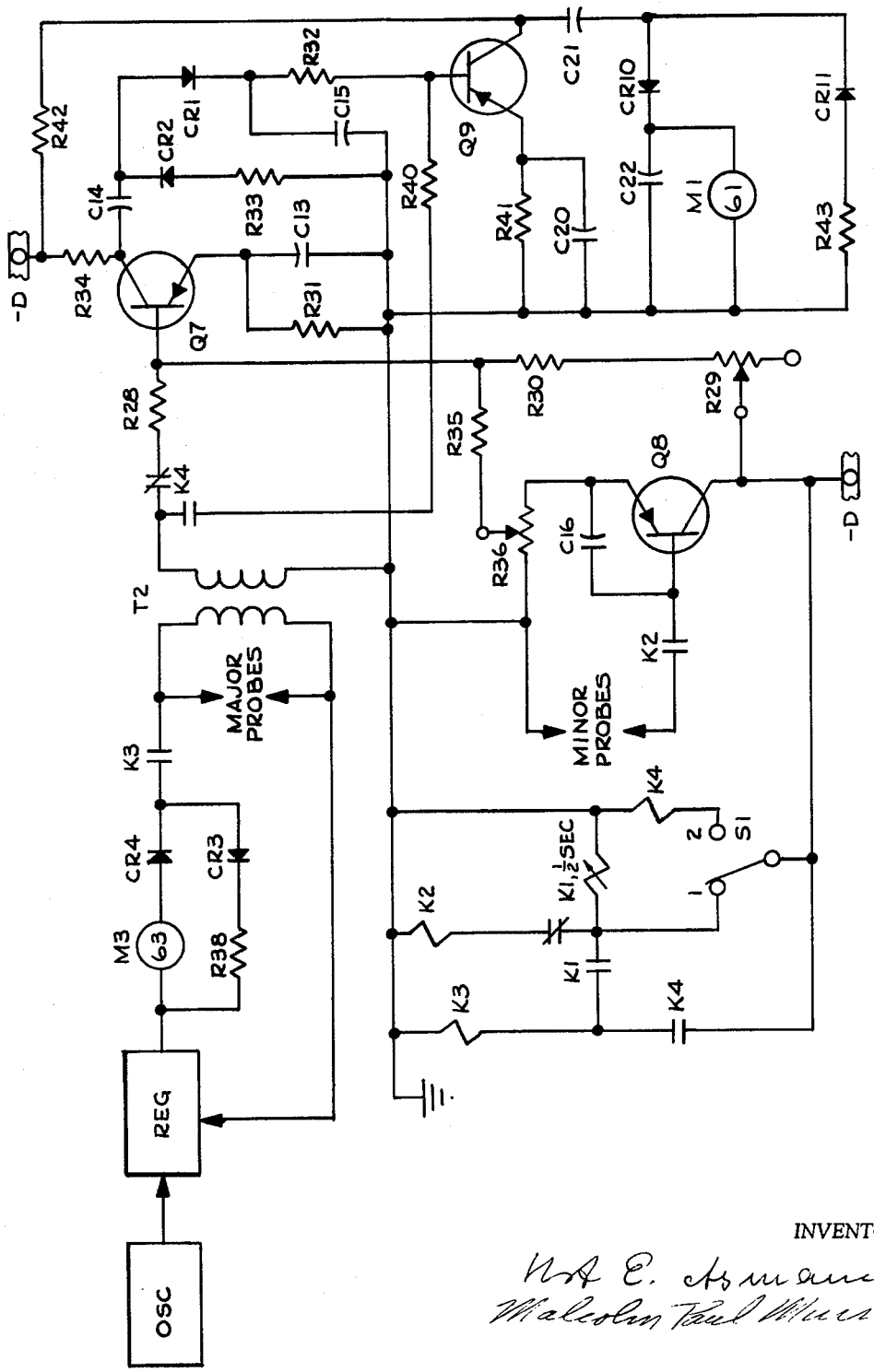

Another embodiment of this invention is set forth in FIGURE 5, which is particularly designed for ease of operation in that only one meter need be utilized. This is made possible by the use of a network for storing the first measurement while the second measurement is being made. The stored information is applied to modify the second measurement so that the resultant reading that is obtained takes into consideration the magnitude of both measurements.

FIGURE 5 should be regarded as identical to FIGURE 3 insofar as the oscillator and regulator portions are concerned, and differs from FIGURE 3 only from the point where the meter 63 and R38 are shown.

As to the detailed operation of the device shown in FIGURE 5, the first measurement is made with the probes positioned at the wide spacing, as previously described. Initially, the minor probes provide an indication of acidity, and through acidity-correcting circuitry of the same nature as shown and described in conjunction with FIGURE 3, bias is provided in FIGURE 5 by the circuitry associated with transistor Q8 and applied to transistor stage Q7.

After a ½ second time period following the movement of Switch S1 to position 1, the relay K3 is energized by operation of relay K1, thus causing the major probes to be connected into the circuit. The voltage developed across these probes is applied through transformer T2 to the base of transistor Q7. The output of this transistor, which provides a voltage proportional to the first impedance measurement of the fruit, is corrected for acidity by the input from transistor Q8. The output of transistor Q7 is stored in capacitor C15 and also applied to the base of transistor stage Q9.

Because a voltage level is being held, it is desirable to conduct the second measurement upon the fruit promptly after the first measurement is completed. This is to say, Switch S1 is now moved to position 2 and subsequently the handle 26 is maniuplated to move the probes to the constant separation position.

Operation of the Switch S1 to position 2 energizes relay K4, whose contacts close to cause a transfer, via resistor R40, of the output of transformed T2 to the base of transistor Q9, which may be of type 1N1499A. This output of T2 is a voltage proportional to the impedance measurement of the fruit in this test. The output of Q9 is a voltage proportional to the properly combined inputs through resistors R40 and R32. These resistors are scaling resistors whose resistance values have been selected to provide the proper weighing of the first measurement relative to the second measurement so that the output voltage from the transistor Q9 will be properly related to pounds of solids.

The output of transistor Q9 is applied through diode arrangement CR10 and CR11 much like that of FIGURE 3 to voltmeter 61, the face of which is calibrated directly in pounds of solids.

As will be evident, the present invention advantageously provides an accurate indication of the quality of fruit that contains certain amounts of acid, by virtue of making sufficient impedance measurements in the interior of the fruit and relating these impedances to the total solids content of the fruit, this being made possible by utilizing the acid content of the fruit as current carriers and measuring the impedance presented by the solids of the fruit.

As will be evident, the circuitry set forth in the figures of drawings are exemplary, and as far as possible embody standard techniques and standard components to enable in accordance with this invention the most advantageous display of the impedance measurements on meters recorders or data printing devices as may be preferred. Additionally, our circuitry also of course provides automatically for the proper interrelation of the various measurements made on the selected fruit samples, thus enabling the operator of such a device in the field to be relatively unskilled.

We claim:
1. An instrument for determining electronically the pounds of solids in citrus fruit or the like, comprising means for establishing a flow of alternating current through at least a portion of the fruit, probe means for providing a readout of impedance present in fruit, thus to provide and indication of the comparative quality of such fruit, and additional means for correcting such readout to take into consideration the acidity of the fruit.

2. An instrument for determining electronically the pounds of solids in citrus fruit or the like, comprising a plurality of probes adapted to penetrate a fruit sample, means for establishing a flow of alternating current through at least a portion of the fruit by causing such current to flow between at least two of said probes, means for providing a readout of impedance existing between latter probes, thus to provide an indication of the comparative quality of such fruit, and additional probe means for penetrating the fruit and to develop a voltage whose magniture deflects the acidity of the fruit, such voltage being utilized to correct the impedance reading to prevent inaccuracy from resulting the acidity of the fruit.

3. The instrument as defined in claim 2 in which means are provided for selectively bringing about probe movement, whereby impedance tests can be conducted at various probe spacings, and means for enabling the size of the fruit sample to be taken into consideration during at least one of said tests.

4. An instrument for determining electronically the pounds of solids in citrus fruits or the like comprising a mounting base, means for mounting with respect to said base at least two relatively movable probes disposed in substantially opposed relation, said probes having tip portions adapted to penetrate a fruit sample, means for selectively causing said probes to move toward one another so as to penetrate such fruit sample, means for testing the impedance of such fruit by establishing a flow of alternating current between the tip portions of at least two substantially oppositely disposed probes, said current passing through a portion of the interior of the fruit being tested, means for registering the impedance existing across said probes while current flows through the fruit, and for converting impedance into pounds of solids, and additional probe means for penetrating the fruit and to develop a voltage whose magnitude reflects the acidity of the fruit, such voltage being utilized to correct the impedance readings to prevent inaccuracy resulting from the acidity of the fruit.

5. The instrument as defined in claim 4 in which said relatively movable probes are relatively movable to a variety of positions, one of said positions reflecting size of the fruit sample and enabling an impedance reading representative of the Brix in the fruit and the total volume of juice in the fruit sample being tested, and another position enabling an impedance reading reflecting the Brix in the fruit.

6. The instrument as defined in claim 4 in which said additional probe means include the use of two metal members, the metal one of one being dissimilar to the metal of the other, whereby the voltage reflecting the acidity of the fruit is devolped by galvanic action.

7. An instrument for determining electronically the pounds of solids in citrus fruit of the like comprising a mounting base, means for mounting a plurality of relatively movable probes, disposed in substantially opposed relation, on said mounting base, means for selectively causing said probes to move toward one another so as to penetrate a fruit sample for selected distances, means for establishing a flow of alternating current between tip portions of such oppositely disposed probes, said current passing through a portion of the interior of the fruit being tested, a first test being conducted with the tips of opposite probes disposed for a first distance in the fruit, and a second test being conducted with the tips of said probes disposed at a second distance, and means for registering the impedance presented by the fruit during each test, and for converting same into pounds of solids.

8. The device as defined in the claim 7 in which supplementary probe means are utilized in conjunction with each of said opposed probe means for determining a correction in the voltage readings to compensate for the acidity of the fruit, said supplementary probe means being made of dissimilar metals so that when inserted into opposing portions of said fruit, a voltage will be developed by galvanic action, said voltage being used to correct the impedance readings obtained.

9. An instrument for determining electronically the pounds of solids in citrus fruit or the like comprising a mounting base, means for mounting thereon a plurality of relatively movable probes disposed in opposed relation, means for causing the spacing between the tip portions of said probes to decrease so as to penetrate a fruit sample for selected distances, means for establishing a flow of alternating current between said tips of oppositely disposed probes, thus causing current to flow through said piece of fruit, means for registering the amount of voltage developed across said probes, a first test being conducted with the tips of opposite probes being disposed for a first distance into said fruit, and a subsequent test being conducted with the tips of said probes disposed at a closer distance, said first test allowing a voltage reading to be developed representative of the Brix in said fruit and the total volume of juice in that particular piece of fruit, said second test having a voltage reading that reflects the Brix in said fruit, and means for applying the results of said first and second tests to the determination of the pounds of solids in said fruit.

10. The device as defined in claim 9 in which electrical meters are employed for furnishing a readout of the voltage developed during each of said tests.

11. The device as defined in claim 9 in which charts reflecting the pounds of solids per volt of meter reading are employed for providing a readout reflecting the pounds of solids in said fruit.

12. An instrument for determining electronically the pounds of solids in citrus fruit or the like comprising a mounting base, means for mounting with respect to said base a plurality of relatively movable probes disposed in substantially opposed relation, said probes having tip portions adapted to penetrate a fruit sample disposed between said probes, means for selectively bringing about probe movement so as to decrease the distance between opposed probe tips for causing such probe tips to enter substantially opposite portions of the fruit sample, means for establishing a flow of alternating current between such probe tips so as to cause such current to flow through at least a portion of said fruit sample, latter means including means to keep the flow of current substantially constant at different depths of penetration of said tips into said fruit, electrical circuitry, including electrical meter means, for utilization during impedance testing of the fruit for indicating the amount of voltage developed across said probe tips, a first test being conducted with the tips of opposite probes disposed for a first distance in said fruit, and a subsequent test being conducted with the tips of said probes disposed at a closer distance, said first test allowing a voltage reading to be developed representative of the Brix in said fruit and the total volume of juice in that particular piece of fruit, and the subsequent test reflecting the Brix in said fruit, and means for applying the voltage readings associated with said first and second tests to the determination of the pounds of solids in said fruit.

13. The instrument as defined in claim 12 in which a correction for the acidity of the fruit is made, said device employing electrical amplification means disposed in the circuitry of said device, and supplementary probe means utilized in conjunction with said relatively movable probe means, said supplementary probe means involving the use of probes disposed to penetrate the piece of fruit at different locations, with the metal of a first supplementary probe being dissimilar to the metal of a second supplementary probe, whereby when said supplementary probes are inserted into said fruit, a voltage will be developed by galvanic action, latter voltage being effective to correct the amplification of said amplification means, thus causing said voltage readings to contain no inaccuracy due to the acidity of the fruit.

14. The instrument as defined in claim 12 in which each of said tests are registered upon separate electrical meters.

15. The instrument as defined in claim 12 in which the voltage reading of said first test is stored, and an electrical meter is used for the readout of said second test, said stored voltage being employed for correcting the output reading of said electrical meter.

References Cited by the Examiner
UNITED STATES PATENTS

| | | | |
|---|---|---|---|
| 1,987,244 | 1/1935 | Moore | 324—65 |
| 2,304,765 | 12/1942 | Pierce et al. | 324—65 X |

WALTER L. CARLSON, *Primary Examiner.*

FREDERICK M. STRADER, *Examiner.*